United States Patent [19]
Nasyrov et al.

[11] 3,983,211
[45] Sept. 28, 1976

[54] METHOD OF PRODUCING ALUMINA AND POTASSIUM SULPHATE FORM ALUNITE

[76] Inventors: Gakif Zakirovich Nasyrov, prospekt Nauki, 12, kv. 49; Nikolai Andreevich Kaluzhsky, Sredny prospekt, 6/13, kv. 123, both of Leningrad; Vladimir Nikolaevich Kostin, Saviskaya naberezhanaya, 3, kv. 82, Moscow, all of U.S.S.R.

[22] Filed: Aug. 25, 1975

[21] Appl. No.: 607,498

Related U.S. Application Data

[63] Continuation of Ser. No. 515,664, Oct. 17, 1974, abandoned, which is a continuation of Ser. No. 398,555, Sept. 18, 1973, abandoned.

[30] Foreign Application Priority Data

Dec. 8, 1972 U.S.S.R. .............................. 1852006

[52] U.S. Cl. .............................. 423/128; 423/120; 423/199; 423/131
[51] Int. Cl.$^2$ .............................. C01F 7/06
[58] Field of Search ........... 423/120, 122, 128, 199, 423/131

[56] References Cited
UNITED STATES PATENTS

| | | | |
|---|---|---|---|
| 1,338,428 | 4/1920 | Downs ............................... | 423/120 |
| 1,951,443 | 3/1934 | Sanders ............................. | 423/120 |
| 2,099,360 | 11/1937 | Yonemura et al. ................ | 423/120 |

*Primary Examiner*—Herbert T. Carter
*Attorney, Agent, or Firm*—Holman & Stern

[57] ABSTRACT

The specific feature of the present method is that in the process solution resulting in the processing of alunite with the object of producing alumina and potassium sulphate therefrom, an excess amount of sodium ions is maintained with respect to the potassium ions.

The method is advantageous in that it ensures a higher yield of potassium sulphate and a lower contamination of the final products with respect to sodium and potassium ions.

8 Claims, No Drawings

METHOD OF PRODUCING ALUMINA AND POTASSIUM SULPHATE FORM ALUNITE

This is a continuation of application Ser. No. 515,664 filed Oct. 17, 1974 which in turn is a Continuation of Ser. No. 398,555 filed Sept. 18, 1973, both of which are now abandoned.

The invention relates to a method of processing alunite, and more particularly it relates to methods of producing alumina and potassium sulphate from alunite.

Methods of producing alumina and potassium sulphate from alunite are widely known in the prior art, and comprising the following operations: processing alunite with caustic alkalies, the result of which is that the aluminates and sulphates of sodium and potassium are transferred into solution; the sulphates of potassium and sodium are precipitated from the solution and potassium sulphate is subsequently isolated from the precipitate of the sulphates of potassium and sodium by being acted upon by a solution of sodium hydroxide; with the isolation of alumina from the solution containing the aluminate of potassium and sodium by their hydrolytic decomposition.

The main disadvantage inherent in the above method is that depending of the ratio of sodium and potassium alkalies contained in the starting alunite stone, the potassium hydroxide is accumulated in the process solution in a quantity exceeding that of sodium hydroxide. Cases were reported where the potassium hydroxide content in the mixture of both alkalies in solution was as high as 60 per cent.

The increased concentration of potassium hydroxide in the process solution involves a few objectionable factors. For example, the solubility of the sulphates in the process solution drastically decreases, which requires considerable dilution of the process solutions; this in turn increases the specific currents of the process solutions, which involves undue energy consumption associated with heating, pumping and evaporating additional quantities of the process solutions: and this decreases correspondingly the overall specific productive capacity of the process equipment.

Moreover, with an increasing content of potassium hydroxide in process solutions, the yield of potassium sulphate from alunite decreases, the conditions for removal of silicon from the process solutions are deteriorated, and the concentration of potassium hydroxide in alumina also increases to from 0.2 – 0.4%.

During further processing of alumina by electrolysis, potassium hydroxide is known to actively destroy the electrolytic equipment.

The main object of the invention is to provide a method of producing alumina and potassium sulphate from alunite in which the potassium ions are not accumulated in quantities exceeding the concentration of the sodium ions.

Another object of the invention is to operate at an optimum ratio between the potassium ions and the sodium ions in the process solution so as to increase considerably the solubility of the sulphates in the process solution and thus avoid considerable dilution of the process solution.

Still another object of the invention is to decrease the potassium hydroxide content of alumina.

Other objects of the invention are to reduce undue energy expenditures by decreasing the specific currents of the process solutions, and, hence, to decrease the energy consumption of heating, pumping and evaporating the process solutions.

The objects of the invention have been attained in a process of producing alumina and potassium sulphate comprising processing alunite with solutions of caustic alkalis to form solutions of aluminates and sulphates of sodium and potassium, by precipitating sodium sulphate and potassium sulphate with subsequently producing potassium sulphate from the precipitate by the reaction of sodium hydroxide thereon and the isolation of alumina from the solution, and according to the invention, the process solution contains excessive quantities of sodium ions with respect to potassium ions.

To be more exact, the precentage concentration in the process solution of sodium ions in the total amount of potassium and sodium ions should not be less than 70 per cent.

The excessive quantities of sodium ions in the solution can be ensured by introducing them in the form of sodium hydroxide during the processing of alunite with caustic alkalies.

The excess concentration of sodium ions can also be ensured by adding them in the form of sodium sulphate during the processing of potassium sulphate and sodium sulphate with a solution of potassium hydroxide.

Given below is a detailed description of a version of the practical embodiment of the invention illustrated by examples.

Alunite stone containing practically any quantities of alunite proper and sulphates of potassium and sodium can be processed according to the invention. As a rule, natural alunite contains potassium sulphate in higher quantities with respect to sodium sulphate.

Alunite stone is first crushed on special crushers, and then ground on ball mills where alunite is reduced in size and mixed with solutions of caustic alkalies at a temperature of 70°–90°C. (Here and further, the commonly used processing conditions are utilized). The process can also be carried out at lower temperatures, but the efficiency of the process decreases.

As a result of this treatment of alunite with caustic alkalies, aluminates and sulphates of sodium and potassium are transferred into solution. From this moment, the solution will be called "process solution." The process solution is separated from sludge and purified from silica admixtures which are present in solution. This is accomplished at a temperature of 100°–105°C by mixing the process solution for 5–6 hours in the presence of aluminosilicate crystals as the crystallization centres. The solution, free from silica, is evaporated until the sulphates of sodium and potassium precipitate; the evaporation step is also necessary to keep the required balance in the process cycle. The precipitate of the salts is separated from the solution which now contains mainly aluminates of potassium and sodium. The separated sulphate residue is processed by a solution of potassium hydroxide, as a result of which potassium sulphate is precipitated, while the remaining liquid contains caustic alkalies which are reused in the process for treating the starting alunite.

The evaporated solution of aluminates of potassium and sodium, free from sulphates of sodium and potassium, is now hydrolyzed by cooling to 45°–43°C in the presence of crystals of aluminium hydroxide, which are used as crystallization centres. The precipitated aluminium hydroxide is separated from solution and calcined in order to obtain alumina. The solution is returned in the process to treat the starting alunite.

During the entire process, the sodium ions are maintained in excess quantities with respect to the potassium ions contained in the process solutions. It is recommended that the concentration of sodium ions in the process solution should not be less than 70 per cent of the total content of potassium and sodium ions. If the process solution contains less than 70 per cent of sodium ions, it is necessary to add more diluent to the process solution. It is possible that the sodium ion concentration in the solution should be over 95 per cent, but this is rather undesirable since in this case the potassium sulphate content in the precipitate (in the mixture of the sulphates during the evaporation of the process solution) decreases.

Since the solution of caustic alkalies may be reused in the treatment of the starting alunite, it is possible to introduce excessive quantities of sodium ions in two ways, namely, by adding them in the form of sodium hydroxide during the processing of the starting alunite with solutions of caustic alkalies, or in the form of sodium sulphate at the stage of processing the precipitate of the sulphates of potassium and sodium with a solution of potassium hydroxide. Owing to the fact that excessive quantities of sodium ions are maintained in the process solution, the most complete (not less than 85 per cent) extraction of sulphates of potassium from alunite is ensured. Moreover, the loss of potassium hydroxide with the sludge decreases not less than 50 per cent. The presence of excess quantities of sodium ions within the range of from 70 to 95 per cent ensures the maximum concentration of potassium sulphate in the precipitate of a mixture of potassium and sodium sulphates as compared with the concentration of potassium sulphate in the evaporated process solution. For example, at 50 percent concentration in the process solution of sodium ions (with respect to the sum of sodium and potassium ions), the concentration of potassium sulphate in the precipitate is about 70 per cent, and if the potassium ion concentration in the process solution is about 20 per cent (with respect to the sum of the potassium and sodium ions), the concentration of potassium sulphate in the sulphate precipitate is 57–60 per cent.

During the hydrolytic decomposition of the process solution containing the aluminates, excess sodium ions ensure a decreased concentration of potassium hydroxide in the aluminium hydroxide and correspondingly in alumina. The experiments have shown that the content of potassium hydroxide in alumina does not exceed 0.1 per cent.

Below are examples of practical embodiment of the method according to the invention.

EXAMPLE 1

Alunite stone containing about 55 per cent of alunite was used in the experiment. The concentration of sulphates of sodium and potassium in the alunite was 4% and 96% respectively (in the sum of the sulphates of sodium and potassium).

One ton of the stone contained, in kg:

$Al_2O_3$, 200; $SO_3$; 210; $K_2O$; 60; $Na_2O$; 2; $H_2O$; 100; and gangue, 430.

The flow-sheet and the temperature conditions of the process in this and other examples are as specified in the description.

The concentration of sodium ions in the process solution during the processing of alunite stone was 70 per cent with respect to the sum of the sodium and potassium ions.

The method and time of introduction of the excess sodium ion in this and other examples are of no practical importance.

Alunite was processed with reused alkali solutions having the following composition and expressed in kg: $K_2O$, 258; $Na_2O$, 398; $Al_2O_3$, 180; $SO_3$, 35; and $H_2O$, 3800.

After this treatment the process solution had the following composition, expressed in kg: $K_2O$, 309; $Na_2O$, 381; $Al_2O_3$, 360; $SO_3$, 235; and $H_2O$, 3900.

After the evaporation of 1900 kg of water from the process solution, the sulphate precipitate contained, in kg: $K_2O$, 145; $Na_2O$, 64; and $SO_3$, 205.

After the treatment of the sulphate precipitate by the potassium hydroxide solution, 433 kg of the precipitate of potassium sulphate with a 5 per cent admixture of sodium sulphate were obtained.

The yield of potassium sulphate from alunite was 85 per cent.

As a result of hydrolytic decomposition of the evaporated solution containing mainly aluminates of sodium and potassium, and upon subsequent calcining of the obtained aluminium hydroxide precipitate, 180 kg of alumina containing about 0.1 per cent of potassium alkali were obtained.

EXAMPLE 2

The alunite stone used in the experiment was the same as in Example 1; the quantity was also the same.

During the processing of the alunite stone, the excess of sodium ions in the process solution was maintained at 90 per cent (with respect to the sum of the sodium and potassium ions in the solution).

The composition of the solutions of alkalies, expressed in kg, was as follows: $K_2O$, 61; $Na_2O$, 550; $Al_2O_3$, 180; $SO_3$, 100; and $H_2O$, 3100.

After the processing of the alunite stone the process solution had the following composition expressed in kg: $K_2O$, 118; $Na_2O$, 532; $Al_2O_3$, 360; $SO_3$, 300; and $H_2O$, 3200.

After the evaporation of 1200 kg of water from the process solution, the sulphate precipitate contained, in kg: $K_2O$, 120; $Na_2O$, 80; and $SO_3$, 205.

After processing the sulphate precipitate with a potassium hydroxide solution, the precipitate of potassium sulphate obtained was in the quantity of 433 kg (containing about 5 per cent of sodium sulphate admixture).

The yield of potassium sulphate from the alunite was 95 per cent.

Alumina was prepared in the quantity of 180 kg. The potassium alkali content was about 0.04 per cent.

EXAMPLE 3

The alunite stone taken for the process in the quantity of one ton, and containing about 50 per cent of alunite, had a potassium sulphate and sodium sulphate content of alunite proper of 60 and 40 per cent respectively (with respect to the sum of the sulphates of potassium and sodium).

The ton of the said alunite stone contained, in kg: $Al_2O_3$, 185; $SO_3$, 194; $K_2O$, 34; $Na_2O$, 15; and $H_2O$, 70; and gangue, 500.

The process solution contained an 80 per cent excess of sodium ions with respect to the sum of the sodium and potassium ions.

The starting process solution had the following composition, expressed in kg: $K_2O$, 110; $Na_2O$, 440; $Al_2O_3$, 170; $SO_3$, 61; and $H_2O$, 3250.

After the processing of alunite, the process solution had the following composition, expressed in kg: $K_2O$, 138; $Na_2O$, 439; $Al_2O_3$, 340; $SO_3$, 245; and $H_2O$, 3320.

After the evaporation of 1400 kg of water from the process solution, the sulphate precipitate was obtained containing, in kg: $K_2O$, 120; $Na_2O$, 57; and $SO_3$, 184.

After the processing of the sulphate precipitate by a solution of potassium hydroxide, 392 kg of potassium sulphate precipitate, were obtained which contained also about 5 per cent of a sodium sulphate admixture.

The yield of potassium sulphate from alunite was 83%.

The yield of alumina was 170 kg which contained about 0.07 per cent of the potassium alkali.

What is claimed is:

1. A method of producing alumina and potassium sulphate from alunite comprising contacting alunite with a solution of caustic alkalies at a temperature of from 70° to 90°C to thereby transfer sulphates and aluminates of sodium and potassium into solution, said solution being denoted the process solution; maintaining a percentage concentration in the process solution of sodium ions with respect to the sum of potassium and sodium ions in the same solution of not less than 70 per cent at all times; precipitating a mixture of sodium and potassium sulphates from the process solution; separating the precipitate from the remaining process solution; treating said precipitate with potassium hydroxide to obtain potassium sulphate; and recovering alumina from said remaining process solution.

2. The method according to claim 1, in which the quantity of sodium ions is introduced into the process solution in the form of sodium hydroxide during the processing of alunite by caustic alkalies.

3. The method according to claim 1, in which the quantity of sodium ions is introduced into the process solution in the form of sodium sulphate which is produced by treating with potassium hydroxide, the precipitate containing a mixture of sulphates of potassium and sodium.

4. The method as claimed in claim 1, wherein the concentration of sodium ions with respect to the sum of potassium and sodium ions in the process solution is from 70 to 95 per cent.

5. The method as claimed in claim 1, wherein the precipitate of sodium and potassium sulphates is produced by evaporating the process solution until said precipitate forms.

6. The method as claimed in claim 1, wherein the alumina is recovered by cooling the remaining process solution to 45°–48°C in the presence of seed crystals of aluminum hydroxide to precipitate aluminum hydroxide and then calcining the aluminum hydroxide.

7. The method as claimed in claim 1, wherein the steps of producing alumina and potassium sulphates from alunite additionally comprise separating and purifying the process solution from the sludge impurities produced therein.

8. The method as claimed in claim 7, wherein the additional step of separating and purifying the process solution is conducted at temperatures of from 100° to 105°C.

* * * * *